July 31, 1923.

C. G. STRANDLUND

WHEELED PLOW

Original Filed June 30, 1915

Witness:
Martin Peterson.
W. J. Duffield

Inventor:
Carl G. Strandlund
by W. C. Johnston
his Attorney

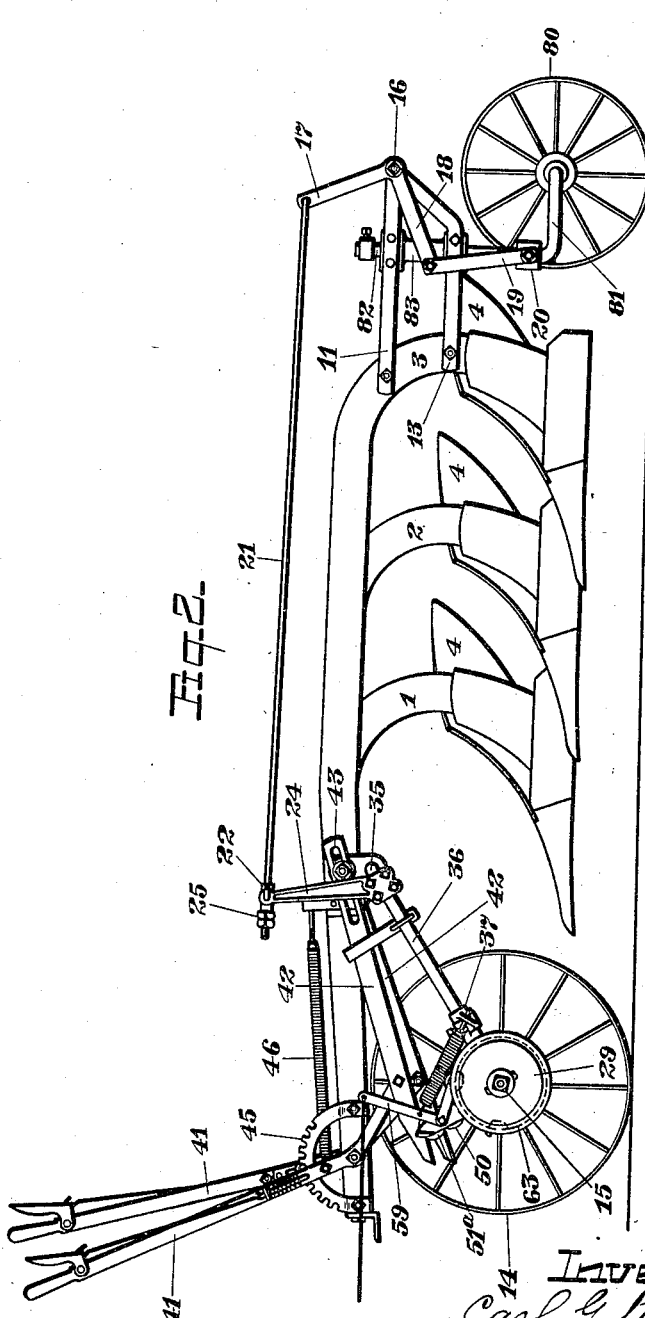

Patented July 31, 1923.

1,463,378

UNITED STATES PATENT OFFICE.

CARL G. STRANDLUND, OF MOLINE, ILLINOIS, ASSIGNOR TO DEERE AND COMPANY, OF MOLINE, ILLINOIS, A CORPORATION OF ILLINOIS.

WHEELED PLOW.

Application filed June 30, 1915, Serial No. 37,370. Renewed August 24, 1917. Serial No. 188,065.

*To all whom it may concern:*

Be it known that I, CARL G. STRANDLUND, a citizen of the United States, residing at Moline, in the county of Rock Island and State of Illinois, have invented certain new and useful Improvements in Wheeled Plows, of which the following is a specification, reference being had therein to the accompanying drawing.

My invention relates to improvements in frameless plows, that is, plows of the class in which each has a plurality of beams and bodies rigidly secured together to form a single plow unit and front and rear wheels by which the plow is transported from place to place, and more particularly to means by which the front and rear of the plow can be raised from the ground simultaneously by power derived from the wheels as will be more clearly set forth in the following specification.

Referring to the drawings in which similar numerals indicate identical parts—

Figure 1 is a side elevation of my improved plow in operative position and with the front landwheel removed.

Figure 2 is a similar view showing the plow raised.

Figures 3, 4 and 5 are details.

The type of plow illustrated in the drawings is more fully shown and described in my Patent No. 1,376,787, dated May 3rd, 1921, in which the plow comprises a plurality of plow beams flexibly connected to an axle supported on land and furrow wheels, the traction power of the latter being employed at will to raise the forward end of the plow from the ground, the rear furrow wheel being manually operated to raise the rear of the plow. My improvement consists in connecting the rear wheel with the mechanism operated by the traction power of the front wheels to raise the forward end of the plow, in such a manner as to cause the entire plow to be raised bodily from the ground. Reference is made to said patent for a more specific description of the structure to which my improvements are shown as applied.

I have shown preferably a gang plow consisting of three beams 1, 2, and 3 to each of which is secured a plow 4 of a well known type, the beams being rigidly connected together as shown and described in the patent hereinbefore noted. A furrow wheel 14 and a land wheel 23 are rigidly mounted on an axle 15 so that the axle and wheels rotate together. The axle 15 revolves with a tubular member or pipe 30, loosely mounted thereon, which extends from the hub of the furrow wheel 14 to the hub of a clutch member 29 preferably integral with the hub of the land wheel 23. A second clutch member 63 is rigidly secured on the tubular member 30.

Pivotally mounted forwardly on the beams 1 and 3 respectively are levers 41 having a portion of their length below their pivots bent at a rearward angle and pivotally attached to rearwardly extending bars 42; the forward ends of the bars 42 extend beyond the axle 15 and their rear ends have slots 43 through which project bolts secured on the beams 1 and 3 and having nuts or heads which hold the bars 42 in position.

The bars 42 are in contact with the axle 15 except when the gang of plows is out of the ground, and by operation of the levers 41 the bars 42 are raised or lowered to fix the depth of plowing desired, the slots 43 permitting free movement of the bars 42 during their adjustment. Mounted on the beams 1 and 3 adjacent the levers thereon are segmental racks 45 with the teeth of which dogs of the usual type on the levers 41 are adapted to engage to hold the levers 41 in any desired position of adjustment. Tension springs 46 are connected to the levers 41, above the pivots of the latter on the beams 1 and 3, and to standards on said beams, the springs 46 lending material assistance in the operation of the levers 41 in actuating the bars 42 against the axle 15.

Journaled in suitable bearings on the beams 1, 2, and 3, are bails 35 which are bent to project forwardly toward the axle 15, the forward extending portions 36 being inserted loosely in sleeves 37 loosely mounted on the tubular member 30. An arm 48 is rigidly secured on the furrowward end of the tubular member 30, a similar arm 52 being rigidly secured on the landward end of the tubular member 30, the free ends of the arms 48 and 52 being connected by a rod 49 on which are mounted rollers 50 and 51ª which are adapted to contact with the bars 42 in the operation of raising the plow.

Rigidly secured to the beam 3 on opposite sides thereof are rearwardly extending upper arms 10 and 11, and similar lower arms 12 and 13 also secured to the beam 3. Rigidly supported between the arms 10, 11, 12 and 13 is a sleeve 83 in which is loosely journaled the vertical portion 82 of a crank axle 81, on the crank end of which is mounted a rear furrow wheel 80; the arms 11 and 13 extend rearwardly of the sleeve 83, the latter arm being bent upwardly and connected to the arm 11 by a bolt 16 which also forms a pivotal support for a bell crank having a vertical arm 17 and a forwardly extending arm 18. To the free end of the arm 18 is pivotally connected a link 19 which extends downward to a pivotal connection with a collar 20 loosely mounted on the vertical portion 82 of the crank axle 81 and below the sleeve 83. A rod 21 is connected to the free end of the arm 17 of the bell crank and extends forwardly through a sleeve 22 which is pivotally mounted on an arm 24, the latter being rigidly secured to the rearward end of the portion 36 of the landward bail 35. The forward end of the rod 21 extends loosely through the sleeve 22 and is threaded to receive a nut 25 forming a stop and preventing the withdrawal of the rod 21 from the sleeve 22. By the operation of a lever 59 the clutch members 63 and 29 are locked together, and as the latter constantly rotates with the axle 15 the member 63 is rotated carrying with it the tubular member 30 to which the arms 48 and 52 are rigidly secured. At the beginning of the movement just described the rollers 50 and 51ª are practically in contact with the bars 42, and as the bars 42 are held rigidly in position on the beams 1 and 3 they are raised by the arms 48 and 52, raising at the same time the plow bodies from the ground to the position shown in Figure 2. The bails 35 fix the relative position of the plow and axle to each other and rock upwardly as the plow is raised so that the movement of the plow when raised or lowered is concentric to the axle 15. As the bails 35 rock upward the arm 24, secured on the landward bail, is also rocked moving the sleeve 22 against the nut or stop 25, and as the rocking action continues the rod 21 is drawn forwardly; the forward motion of the rod 21, which is connected to the arm 17 of the bell crank, rocks the latter forwardly; this operation rocks the arm 18 downwardly, and as the link 19 to which the arm 18 is pivotally connected, is fixed against vertical movement, the force exerted in the forward movement of the rod 21 lifts the plow through the bell crank connection with the arms 11 and 13, the latter being connected to the beam 1, and also to the sleeve 83 which moves upward on the vertical portion 82 of the crank axle 81 until the plow is raised to the desired height.

In Figure 1 of the drawings it will be noticed that the nut 25 is spaced away from the sleeve 22, the plow being in the ground, consequently the points of the plow will begin to rise before the mechanism described for raising the rear of the plow is actuated. It is evident that by adjusting the nut 25 toward or from the sleeve 22 the degree of elevation of the plow points in the initial operation of raising the plow can be quickly regulated. Spacing the nuts 25 away from the sleeve 22 also permits the front wheels to follow the inequalities of the ground without actuating the parts operative to raise the rear of the plow.

As far as possible reference numerals are employed similar to those in the drawings of my patent hereinbefore alluded to.

The collar at 20 it will be seen bears downward on the horizontal part 81 of the carrier or crank axle 81, 82, of the rear wheel. It serves as a support and stop for downward movement of the rear end of the beam structure, the parts indicated by 11, 13 and 83 carried by said structure normally resting upon this stop or abutment at 20 when the plows are at work. And the rear end of the beam structure continues to so rest while plowing in all of the ordinary adjustments as to depth.

While it is not regarded as necessary to herein repeat in full the illustrations of the detail devices at the front end of the apparatus which are fully shown and described in my said patent, and to which reference can be made for such fuller illustration, it is to be noted that there is a lever system for lifting or lowering the front end of the beam structure to adjust the depth of plowing and also for leveling the two sides of the structure. This lever system, as shown, comprises two levers with segments and locks or dogs as above described.

The clutch or traction driven power mechanism at 29 is carried by the crank or bail part 36 of the rocking crank axle and comprises a constantly rotating element and an intermittingly acting element actuated at option. The two parts of the clutch or power device are normally held out of engagement by the lower arm of the bell crank lever at 59. But they are brought into engagement at any instant when the cord is pulled. They are automatically disengaged at predetermined instants in the well known way. And the starting and stopping of this power mechanism is effected entirely independently of the manual lifting devices whose locks remain closed when the power mechanism is starting and while it remains at work.

Power for lifting the rear end of the beam structure as well as for lifting the front end is applied economically because of the use of a power crank such as at 36 rocking vertically around a fixed axis on the frame around which axis also rocks the power transmitting arm 24.

I am aware of the fact that plows have been proposed each comprising a frame, front wheels supported by swinging bails, a rear bodily swinging furrow wheel, together with a hand lever connected directly to the rear wheel support, and link connections extending from the hand lever to the front wheel supports, said parts being so arranged that when power is manually applied to the lever the front end of the frame is first raised and subsequently the rear end. And I do not include such mechanism within my claims. But I believe myself to be the first to have mounted a swinging traction-actuated motor on the front wheel system and to have connected thereto primarily the land wheel and, secondarily, both the land wheel and the front furrow wheel; and to have provided means for transmitting the increased power thus attained to the rear end of the frame as well as to the front end.

What I claim is—

1. In a frameless plow of the class described the combination of the series of beams secured together as a frame structure, the bodies carried by said beams, a wheel at the front end of the beam structure, a vertically swinging crank axle carrying said wheel and journaled on the frame on a fixed axis, a second wheel at the front end of the beam structure on which the latter is adapted to be raised or lowered, means at the rear end of the beam structure for lifting and supporting it, a manual mechanism on the frame for adjusting the depth of plowing and for leveling the plow comprising two levers and locks therefor, an automatic optionally acting lifting mechanism on the swinging crank axle supplemental to said levers and adapted to be actuated independently thereof for applying traction power to the said crank axle to lift the front end of the plow structure, a crank arm rigid with and actuated by the swinging crank axle, and a power transmitting link actuated by and extending from the said arm to the said lifting mechanism at the rear end of the beam structure.

2. In a frameless plow, the combination of the beams secured together, the plow bodies carried thereby, the relatively vertically movable rear wheel, the two relatively vertically movable front wheels at the sides of the front end of the beam frame, the downward inclined crank arms which carry the latter wheels, each arm connected to a rocking shaft element of the frame, power transmitting means extending rearward from and actuated by a shaft element for moving the rear end of the frame vertically, the movable abutment device on the frame, the hand lever for adjusting such abutment vertically to regulate the depth of plowing, the traction actuated intermittently operating power device arranged to bear against the said adjustable abutment and separate the beam frame from the wheels when the plows are to be lifted and to operate the said power transmitting means.

In testimony whereof I affix my signature, in presence of two witnesses.

CARL G. STRANDLUND.

Witnesses:
JESSIE SIMSER,
N. G. DUFFIELD.